United States Patent
Whitehill et al.

(10) Patent No.: US 9,852,327 B2
(45) Date of Patent: Dec. 26, 2017

(54) HEAD-POSE INVARIANT RECOGNITION OF FACIAL ATTRIBUTES

(71) Applicant: Emotient, Inc., San Diego, CA (US)

(72) Inventors: Jacob Whitehill, Cambridge, MA (US); Javier R. Movellan, La Jolla, CO (US); Ian Fasel, San Diego, CA (US)

(73) Assignee: Emotient, Inc., San Diego, CA (US)

( * ) Notice: Subject to any disclaimer, the term of this patent is extended or adjusted under 35 U.S.C. 154(b) by 0 days.

(21) Appl. No.: 15/406,034

(22) Filed: Jan. 13, 2017

(65) Prior Publication Data

US 2017/0213075 A1 Jul. 27, 2017

Related U.S. Application Data

(63) Continuation of application No. 14/802,587, filed on Jul. 17, 2015, now Pat. No. 9,547,808, which is a continuation-in-part of application No. 13/944,018, filed on Jul. 17, 2013, now Pat. No. 9,104,907.

(51) Int. Cl.
*G06K 9/00* (2006.01)
*G06K 9/62* (2006.01)
*G06K 9/32* (2006.01)

(52) U.S. Cl.
CPC ....... *G06K 9/00302* (2013.01); *G06K 9/3208* (2013.01); *G06K 9/627* (2013.01); *G06K 2209/27* (2013.01)

(58) Field of Classification Search
CPC ....... G06K 9/00302–9/00315; G06K 9/00335; G04N 5/23219
See application file for complete search history.

(56) References Cited

U.S. PATENT DOCUMENTS

| | | | |
|---|---|---|---|
| 5,774,591 A | 6/1998 | Black |
| 5,802,220 A | 9/1998 | Black |
| 7,848,548 B1 | 12/2010 | Moon |
| 8,112,371 B1 | 2/2012 | Tu |
| 8,219,438 B1 | 7/2012 | Moon |
| 8,401,248 B1 | 3/2013 | Moon |
| 8,798,374 B2 | 8/2014 | Bartlett |
| 9,105,119 B2 | 8/2015 | Whitehill |
| 2003/0026588 A1 | 2/2003 | Elder |
| 2003/0081834 A1 | 5/2003 | Philomin |

(Continued)

*Primary Examiner* — Aaron W Carter
(74) *Attorney, Agent, or Firm* — Blank Rome LLP

(57) ABSTRACT

A system facilitates automatic recognition of facial expressions or other facial attributes. The system includes a data access module and an expression engine. The expression engine further includes a set of specialized expression engines, a pose detection module, and a combiner module. The data access module accesses a facial image of a head. The set of specialized expression engines generates a set of specialized expression metrics, where each specialized expression metric is an indication of a facial expression of the facial image assuming a specific orientation of the head. The pose detection module determines the orientation of the head from the facial image. Based on the determined orientation of the head and the assumed orientations of each of the specialized expression metrics, the combiner module combines the set of specialized expression metrics to determine a facial expression metric for the facial image that is substantially invariant to the head orientation.

20 Claims, 14 Drawing Sheets

(56) References Cited

U.S. PATENT DOCUMENTS

| | | |
|---|---|---|
| 2003/0123713 A1 | 7/2003 | Geng |
| 2003/0133599 A1 | 7/2003 | Tian |
| 2005/0180626 A1 | 8/2005 | Moon |
| 2007/0122036 A1 | 5/2007 | Kaneda |
| 2007/0189584 A1 | 8/2007 | Li |
| 2008/0024505 A1 | 1/2008 | Gordon |
| 2008/0201144 A1 | 8/2008 | Song |
| 2008/0240563 A1 | 10/2008 | Takano |
| 2008/0247611 A1 | 10/2008 | Aisaka |
| 2009/0279786 A1 | 11/2009 | Kasugai |
| 2010/0054550 A1 | 3/2010 | Okada |
| 2010/0086215 A1 | 4/2010 | Bartlett |
| 2011/0007174 A1 | 1/2011 | Bacivarov |
| 2011/0263946 A1 | 10/2011 | El Kaliouby |
| 2012/0052476 A1 | 3/2012 | Graesser |
| 2012/0083675 A1 | 4/2012 | El Kaliouby |
| 2012/0113211 A1 | 5/2012 | Yi |
| 2013/0005443 A1 | 1/2013 | Kosta |
| 2013/0232515 A1 | 9/2013 | Rivera |
| 2014/0016860 A1 | 1/2014 | Senechal |
| 2014/0035934 A1* | 2/2014 | Du .................... G06T 13/40 345/474 |
| 2014/0049563 A1 | 2/2014 | Tobin |
| 2014/0055337 A1 | 2/2014 | Karlsson |
| 2014/0072234 A1 | 3/2014 | Puri |
| 2014/0123162 A1 | 5/2014 | Karlsson |
| 2014/0176662 A1 | 6/2014 | Goodman |
| 2014/0242560 A1 | 8/2014 | Movellan |
| 2014/0270376 A1 | 9/2014 | Kaneda |
| 2014/0328547 A1 | 11/2014 | Whitehill |
| 2015/0023603 A1 | 1/2015 | Whitehill |
| 2015/0035825 A1* | 2/2015 | Zhou .................... G06T 13/40 345/419 |
| 2015/0324632 A1 | 11/2015 | Whitehill |
| 2015/0324633 A1 | 11/2015 | Whitehill |
| 2016/0217319 A1* | 7/2016 | Bhanu .............. G06K 9/00288 |
| 2017/0116467 A1* | 4/2017 | Li .................... G06K 9/00288 |

* cited by examiner

110c

110a

110b

HEAD-POSE INVARIANT RECOGNITION OF FACIAL ATTRIBUTES

BACKGROUND OF THE INVENTION

1. Field of the Invention

This invention relates generally to automatic recognition of facial attributes such as facial expressions, and more particularly, to automatic recognition that is invariant to the head orientation (aka, head pose).

2. Description of the Related Art

A facial expression is a visible manifestation of the affective state, cognitive activity, intention, personality, and/or psychopathology of a person. Facial expressions convey non-verbal communication cues in face-to-face interactions. These cues may also complement speech by helping the listener to elicit the intended meaning of spoken words. As a consequence of the information they carry, facial expressions not only help in interpersonal communications but also play an important role whenever humans interact with machines.

Automatic recognition of facial expressions may act as a component of natural human-machine interfaces. Such interfaces could enable the automated provision of services that require a good appreciation of the emotional state of the person receiving the services, as would be the case in transactions that involve negotiations. Some robots can also benefit from the ability to recognize facial expressions. Automated analysis of facial expressions for behavior science or medicine is another possible application domain.

However, in current automatic facial expression recognition (AFER) systems, the output tends to vary with the orientation of the head. The orientation of the head may be determined by the position of the camera relative to the head, and may be expressed by the three Euler angles (yaw, pitch, roll). For example, commercially available AFER systems typically will assign different smile probability values for the same facial expression captured from different points of view.

Therefore, there is a need for AFER systems that can provide recognition of facial expressions and other attributes, that is invariant to changes in the head pose.

SUMMARY OF THE INVENTION

The present invention overcomes the limitations of the prior art by providing a system for automatic recognition of facial expressions (or other attributes of the facial image or the subject or circumstances) in a way that is invariant to the head orientation.

In one embodiment, the system includes a data access module and an expression engine. The data access module accesses a facial image of a head. The expression engine uses the facial image to determine a facial expression metric for the facial image. The facial expression metric is an indication of a facial expression of the facial image and the facial expression metric is substantially invariant to an orientation of the head.

In one aspect, the expression engine includes a set of specialized expression engines, a pose detection module, and a combiner module. The set of specialized expression engines generates a set of specialized expression metrics, where each specialized expression metric is an indication of a facial expression of the facial image assuming a specific orientation of the head. The pose detection module determines the orientation of the head from the facial image. Based on the determined orientation of the head and the assumed orientations of each of the specialized expression metrics, the combiner module combines the set of specialized expression metrics to determine a facial expression metric for the facial image that is substantially invariant to the head orientation. In one approach, the orientation of the head is expressed by the three Euler angles (yaw, pitch, roll).

In another approach, the combiner module determines weights for the specialized expression metrics based on the determined orientation of the head and the assumed orientations of each of the specialized expression metrics. The combiner module then produces a weighted sum of the specialized expression metrics using the determined weights.

In yet another aspect, a similar approach is applied to determine attributes of the facial image other than facial expression. For example, gender, age or other attributes of the original facial image may be determined in a manner that is substantially invariant to the orientation of the head.

Other aspects of the invention include methods, devices, systems, applications, variations and improvements related to the concepts described above.

BRIEF DESCRIPTION OF THE DRAWINGS

The invention has other advantages and features which will be more readily apparent from the following detailed description of the invention and the appended claims, when taken in conjunction with the accompanying drawings, in which:

Figure 1:
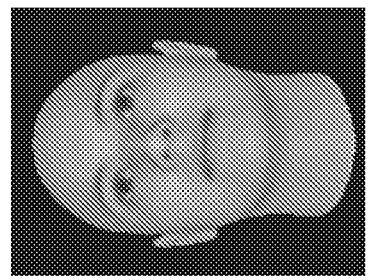
FIG. 1 shows a set of images of a head at different pitch angles.
Figure 1:
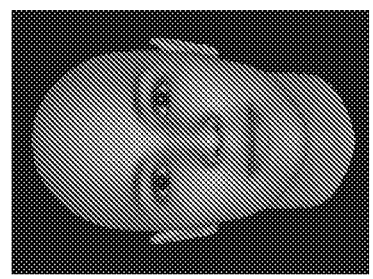
Figure 1:
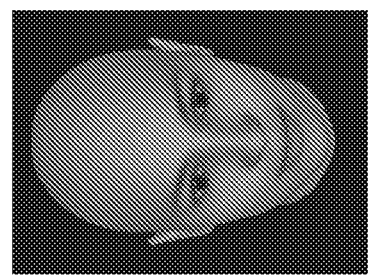

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed. To facilitate understanding, identical reference numerals have been used where possible, to designate identical elements that are common to the figures.

FIG. 1 shows a set of images 110a-c of a head at different pitch angles. The image 110a depicts a head looking forward with a pitch angle of 0° (i.e. frontal view). The image 110b depicts a head looking downward with a pitch angle of −20°. The image 110c depicts a head looking upward with a pitch angle of +20°. The images 110b and 110c are non-frontal views. Note that the three images 110a-c show the same head with the same facial expression, but from different viewpoints. However, conventional AFER systems typically would produce different outputs for each image due to the different head orientations. For example, the conventional AFER system may be configured as a smile detector, and the output of the AFER system is an estimated probability that the facial expression is a smile. Most conventional AFER systems perform best for frontal views. Thus, the AFER system's estimated smile probability value for image 110a may be close to 1.0, while the estimated smile probability values for image 110b may be as low as 0.29 and that for image 110c may be somewhere in between, for example 0.53. The only difference among the three images is the pitch angle. The facial expression does not vary based on the head orientation, and yet the facial expression metric (e.g., the smile probability value) predicted by the AFER system varies significantly depending on the head orientation. This highlights the need of improved AFER systems to provide head-pose invariant facial expression recognition for real-world applications.

Figure 2:
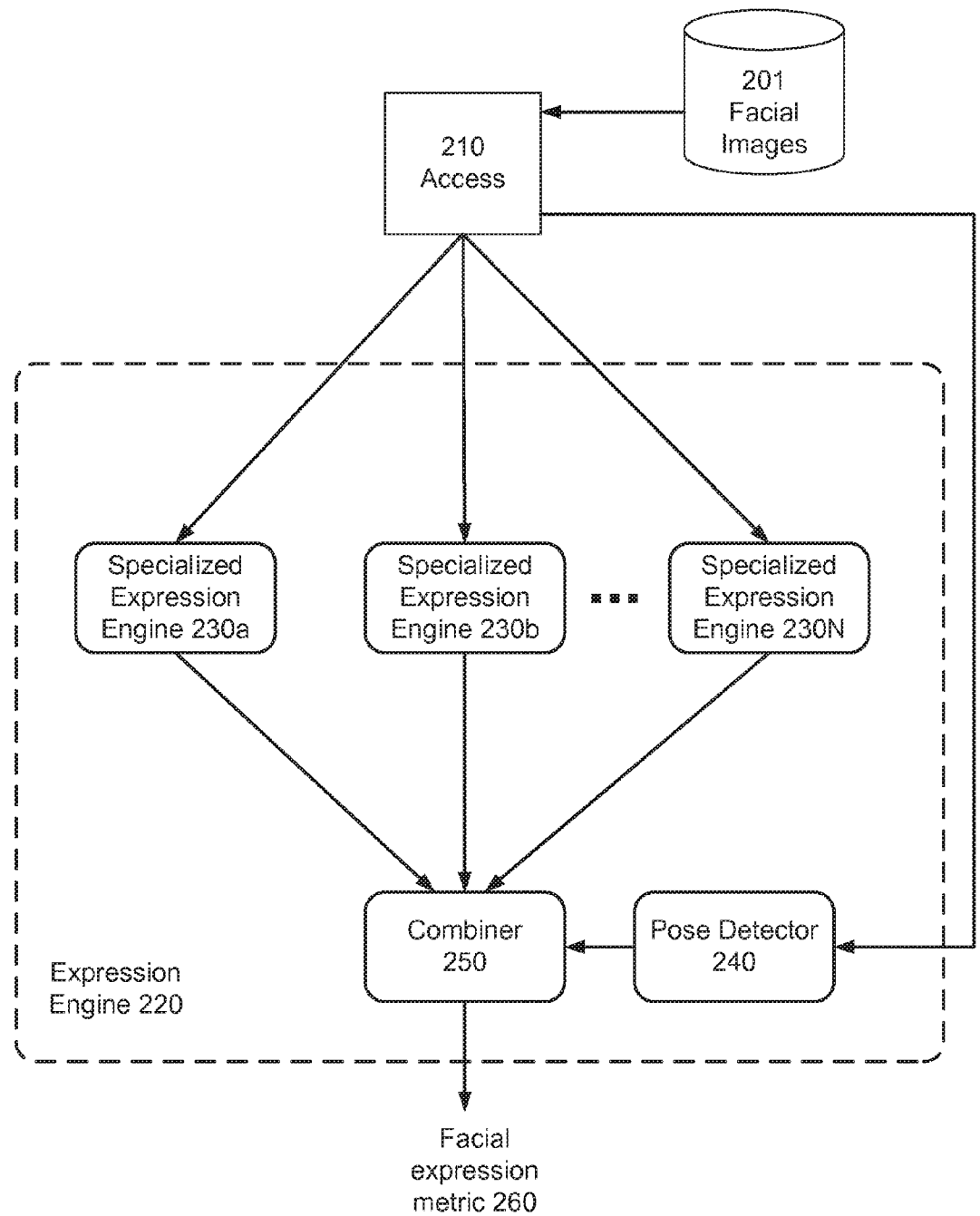
FIG. 2 is a block diagram of a system for automatically recognizing facial expressions.

FIG. 2 is a block diagram of a system for automatically recognizing facial expressions. In one embodiment, the system includes a data access module 210 and an expression engine 220. The data access module 210 accesses a facial image to be analyzed, from a source of facial images 201. The source could be a database of previously captured images, a source of facial images captured in real-time (such as a camera that provides surveillance over an area), or other source of facial images. Assume for this example that the source is a database of facial images. The database of facial images 201 contains a large number of facial images of people. Some images may include more than one facial image. For example, a picture taken for a five-person gathering includes five facial images. In one implementation, the data access module 210 detects the presence of five facial images in the picture, crops out each facial image from the picture, and accesses each facial image.

From the accessed facial image, the expression engine 220 determines a facial expression metric 260 for the facial image. The facial expression metric 260 is an indication of a facial expression of the facial image, and it is determined in such a way that it is substantially invariant to the head pose. For example, the facial expression metric 260 may include a confidence level that the facial image expresses a predefined facial expression. The predefined facial expression may be selected from a finite group of predefined facial expressions, which may include joy, sadness, fear, surprise, anger, contempt, disgust, frustration, confusion, engagement, among others. Alternately or in addition, the finite group of predefined facial expressions may include action units from the Facial Action Coding System (FACS). Suppose that the predefined facial expression is smile for illustration purposes. For instance, the confidence level may range from 0 to 100. A confidence level of 100 may specify that the system is 100% confident (or maximally confident) that the facial image expresses smile, and a confidence level of 0 may specify that the system has zero confidence (or minimal confidence) that facial image expresses smile.

Alternatively, the facial expression metric 200 may include a probability that the facial image expresses a predefined facial expression. As an example, a facial expression metric of 0.3 may indicate that there is a 30% chance that the person in the facial image is smiling (i.e., a smile probability value). In some cases, the facial expression metric 260 may include an intensity indicator of a predefined facial expression found in the facial image. For example, the intensity indicator may range from 0 to 10 for the predefined facial expression of smile. An intensity indicator of 10 specifies a full smile, while an intensity indicator of 2 specifies a subtle smile.

In one embodiment, the expression engine 220 includes a set of N specialized expression engines 230a-N and a combiner module 250. In some embodiments, the expression engine 220 further includes a pose detector 240 (i.e., a pose detection module). Each specialized expression engine 230 receives a copy of the facial image from the data access module 210, and outputs a specialized expression metric that is input to the combiner module 250. The set of specialized expression metrics is an indication of the facial expression of the image, and varies with the head pose in the facial image. The combiner module 250 then combines the set of specialized expression metrics to determine the facial expression metric 260. Note that the facial expression metric 260 is also an indication of the facial expression of the facial image, but is substantially invariant to the head pose.

In one approach, each specialized expression engine 230 is a machine learning engine, and can be trained using standard machine learning algorithms, e.g., support vector machines, boosting, back-propagation, contrastive divergence, etc. Each specialized expression engine 230 is trained to recognize facial expressions over a narrow range of head poses. For example, the narrow range may be a 10-degree solid angle (i.e., +/−5 degrees) centered around a nominal head orientation for that specialized expression engine. That is, specialized expression engine 230a may be trained for head poses that are within +/−5 degrees of the frontal view, engine 230b may be trained for head poses that are within +/−5 degrees of 0 degrees pitch and +10 degrees yaw, engine 230c may be trained for head poses that are within +/−5 degrees of 0 degrees pitch and +20 degrees yaw, engine 230d may be trained for head poses that are within +/−5 degrees of +10 degrees pitch and 0 degrees yaw, engine 230e may be trained for head poses that are within +/−5 degrees of +10 degrees pitch and +10 degrees yaw, and so on for different values of pitch and yaw (and possibly also roll). As a result, each specialized expression engine 230 is an expert specializing in facial images from its narrow range of head poses.

The output of each specialized expression engine, the specialized expression metric, is an indication of a facial expression of the facial image, assuming a specific orientation of the head. The different specialized expression metrics correspond to different assumed orientations of the head. For example, the set of specialized expression engines 230 may be trained to detect smile, and the output of each specialized expression engine may include a smile probability value. Each smile probability value is judged "from the point of view" of the corresponding expert, and therefore may not provide a "global picture" of the estimation whether the person in the facial image actually smiles or not. In other words, each expert's expertise is concentrated on the expert's narrow range of head poses. Therefore, an expert's output is most reliable if the head orientation in the facial image falls within the expert's range. The combiner module 250 combines the outputs of the N experts (i.e., the set of specialized expression metrics) to obtain a "global" estimation of the smile probability (i.e., the facial expression metric 260). This metric is substantially invariant to the orientation of the head in the facial image. The expression engine 220 can thus be viewed as a mixture of experts, or a "general expert" whose expertise is broad enough to cover the aggregate of each expert's expertise.

In one implementation, the pose detector 240 also receives a copy of the facial image from the data access module 210, and determines the orientation of the head from the facial image. In one approach, the orientation of the head is expressed by the three Euler angles (yaw, pitch, roll). The pose detector 240 then sends the determined orientation of the head to the combiner module 250. Based on the determined orientation of the head and the assumed orientation of each of the specialized expression metrics, the combiner module 250 combines the set of specialized expression metrics.

For example, the set of specialized expression metrics may be represented by a vector $p=(p_1, p_2, \ldots, p_N)$, where $p_i$ represents the $i^{th}$ specialized expression metric. The combiner module 250 may determine a set of weights for the set of specialized expression metrics based on the determined orientation of the head and the assumed orientations of each of the specialized expression metrics. In some cases, the combiner module 250 is also a machine learning engine, and may be trained together with the specialized expression engines 230. The set of weights may be represented by a vector $a=(a_1, a_2, \ldots, a_N)$, where $a_i$ represents the weight for the $i^{th}$ specialized expression metric. For instance, if the determined orientation of the head falls within an expert's expertise, the combiner may assign a relatively high weight for that expert and relatively weights for other experts. The final output of the combiner module 250 (i.e., the facial expression metric 260) may be expressed as a weighted sum of the specialized expression metrics. Using the vector notations above, the facial expression metric 260 can be conveniently expressed as $y=p \cdot a = \Sigma_{i=1}^{N} p_i a_i$. In some cases, the facial expression metric 260 may be obtained using other methods, such as a nonlinear function of p and a. The facial expression metric 260 obtained in this way may be substantially invariant to the head pose, as illustrated in more details below.

Figure 3:
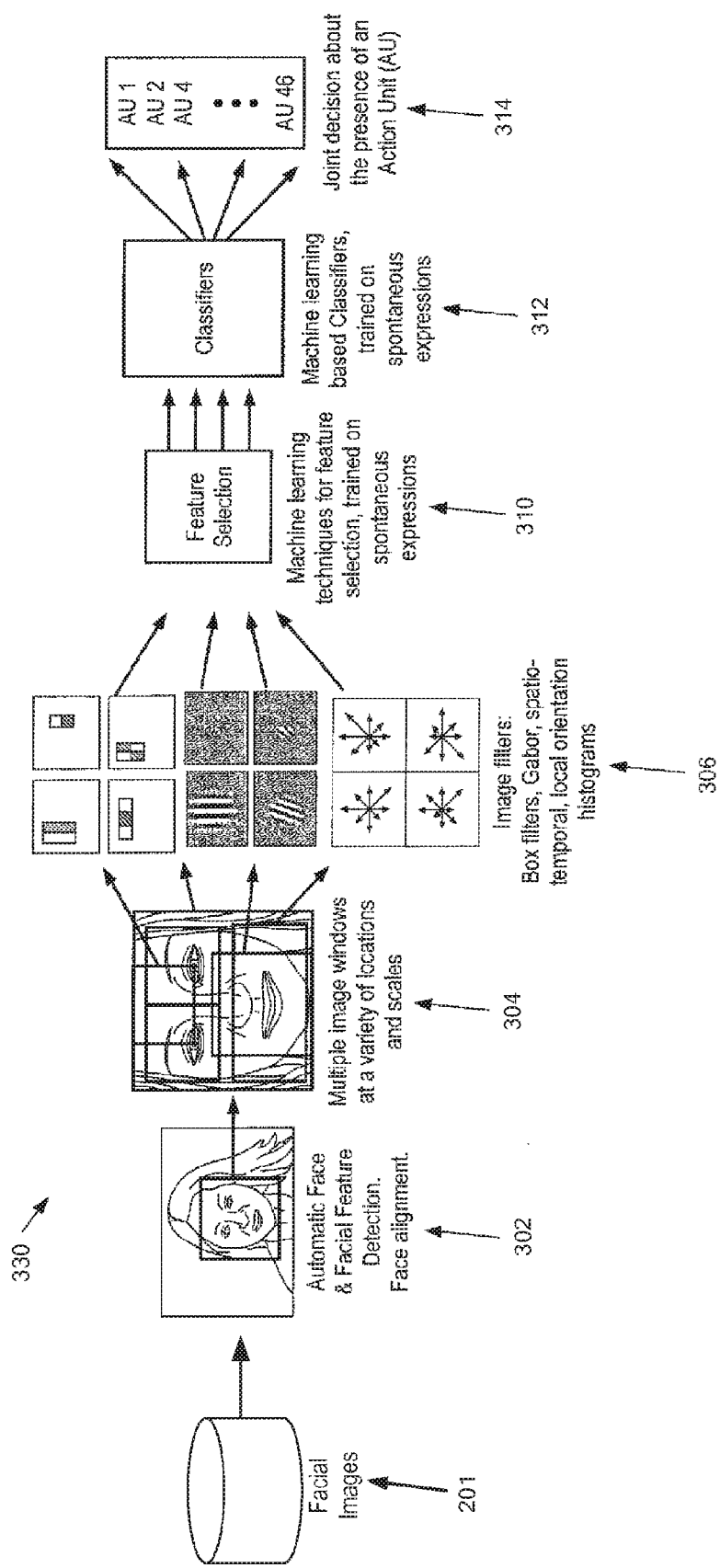
FIG. 3 is a block diagram of an example of a specialized expression engine

FIG. 3 is a block diagram of an example of a specialized expression engine 330. In the embodiment shown in FIG. 3, the specialized expression engine is a system based on facial action coding. In other embodiments, a specialized expression engine may be a smile detector, an anger detector, and the like, regardless of whether based on facial action coding.

Facial action coding is one system for assigning a set of numerical values to describe facial expression. The system in FIG. 3 receives facial images and produces the corresponding facial action codes. A source module 201 provides a set of facial images. At 302, a face detection module automatically detects the location of a face within an image (or within a series of images such as a video), and a facial feature detection module automatically detects the location of facial features, for example the mouth, eyes, nose, etc. A face alignment module extracts the face from the image and aligns the face based on the detected facial features. In some cases, the above functions may be accomplished by the face detection module alone. For the purposes of this disclosure, an image can be any kind of data that represent a visual depiction of a subject, such as a person. For example, the term includes all kinds of digital image formats, including but not limited to any binary or other computer-readable data representation of a two-dimensional image.

After the face is extracted and aligned, at 304 a feature location module defines a collection of one or more windows at several locations of the face, and at different scales or sizes. At 306, one or more image filter modules apply various filters to the image windows to produce a set of characteristics representing contents of each image window. The specific image filter or filters used can be selected using machine learning methods from a general pool of image filters that can include hut are not limited to Gabor filters, box filters (also called integral image filters or Haar filters), and local orientation statistics filters. In some variations, the image filters can include a combination of filters, each of which extracts different aspects of the image relevant to facial action recognition. The combination of filters can optionally include two or more of box filters (also known as integral image filters, or Haar wavelets), Gabor filters, motion detectors, spatio-temporal filters, and local orientation filters (e.g. SIFT, Levi-Weiss).

The image filter outputs are passed to a feature selection module at 310. The feature selection module, whose parameters are found using machine learning methods, can include the use of a machine learning technique that is trained on a database of spontaneous expressions by subjects that have been manually labeled for facial actions from the Facial Action Coding System. The feature selection module 310 processes the image filter outputs for each of the plurality of image windows to choose a subset of the characteristics or parameters to pass to the classification module at 312. The feature selection module results for the two or more image windows can optionally be combined and processed by a classifier process at 312 to produce a joint decision regarding the posterior probability of the presence of an action unit in the face shown in the image. The classifier process can utilize machine learning on the database of spontaneous facial expressions. At 314, a promoted output of the specialized expression engine 330 can be a score for each of the action units that quantifies the observed "content" of each of the 46 action units (AU) in the face shown in the image. This by itself may be used as a specialized expression metric. The specialized expression metric may be represented by a vector of 46 components, each component being a score for an AU, e.g., the probability of the presence of the AU in the facial image. Alternately, the specialized expression metric may be a combination of the AUs, for example the probability of a smile at a certain head orientation. In other embodiments, the specialized expression metric may simply be determined without using action units.

In some implementations, the specialized expression engine 330 can use spatio-temporal modeling of the output of the frame-by-frame action units detectors. Spatio-temporal modeling includes, for example, hidden Markov models, conditional random fields, conditional Kalman filters, and temporal wavelet filters, such as temporal Gabor filters, on the frame-by-frame system outputs.

In one example, the automatically located faces can be rescaled, for example to 96×96 pixels. Other sizes are also possible for the rescaled image. In a 96×96 pixel image of a face, the typical distance between the centers of the eyes can in some cases be approximately 48 pixels. Automatic eye detection can be employed to align the eyes in each image before the image is passed through a bank of image filters (for example Gabor filters with 8 orientations and 9 spatial frequencies (2:32 pixels per cycle at ½ octave steps)). Output magnitudes can be passed to the feature selection module and sacral action code classification module. Spatio-temporal Gabor filters can also be used as filters on the image windows.

In addition, in some implementations, the specialized expression engine 330 can use spatio-temporal modeling for temporal segmentation and event spotting to define and extract facial expression events from the continuous signal (e.g., series of images forming a video), including onset, expression apex, and offset. Moreover, spatio-temporal modeling can be used for estimating the probability that a facial behavior occurred within a time window. Artifact removal can be used by predicting the effects of factors, such as head pose and blinks, and then removing these features from the signal.

As described above, a specialized expression engine is an expert specializing in facial images from a narrow range of head poses. As is result, the specialized expression engine 330 as shown in FIG. 3 may be trained to be most accurate for facial images having head orientations within its intended working range (i.e., the expert's expertise). Any predictions made by the specialized expression engine on facial images having head of orientations outside the specialized expression engine's intended working range may be less trustworthy.

Figure 4:
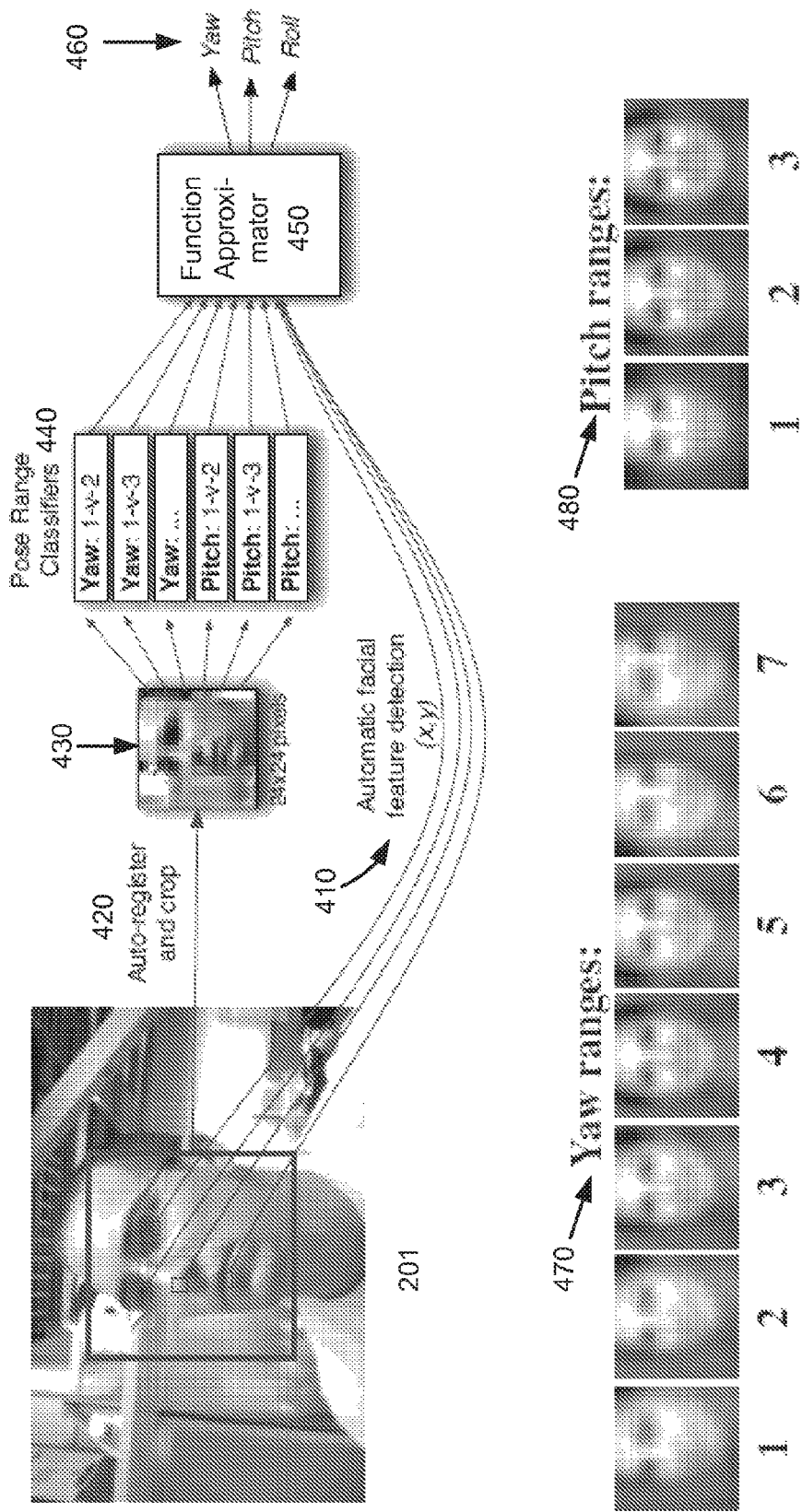
FIG. 4 illustrates operation of an example pose detector.

FIG. 4 illustrates operation of an example pose detector. For a facial image 201 (or an input video frame), the face is detected using a face detection system (e.g., OpenCV). Facial features are detected automatically as (x, y) coordinates 410. Specifically, the centers of both eyes (defined as the midpoint between the inner and outer eye corner), the tip of the nose, and the center of the mouth are detected. A face patch 430 is registered and cropped 420 using, for example the locations of the eyes. In one approach, the face patch 430 may be downscaled, for example to 24×24 pixels. The face patch 430 may also be further converted to grayscale, and normalized to zero mean and unit variance.

The cropped face pixels in the face patch 430 are passed through an array of pose range classifiers 440 that are trained to distinguish between different ranges of yaw, pitch, and roll. In one implementation, the yaw space is partitioned into seven ranges 470, and the pitch space is partitioned into three ranges 480. The yaw ranges 470 are (from 1-7): [−45, −30], [−30, −18], [−18, −06], [−06, +06], [+06, +18], [+18, +30], and [+30, +45] in degrees. The pitch ranges 480 are (from 1-3): [−45, −10], [−10, +10], and [+10, +45] in degrees. A sample facial image from each of the seven yaw ranges and three pitch ranges is shown to facilitate illustration. These ranges are described for illustration purposes only. Other partitions of the yaw space and the pitch space are possible. In the example shown in FIG. 4, no partition of the roll space is implemented since the roll angle of a face may be accurately estimated using feature point positions. In other implementations, the roll space may be similarly partitioned into roll ranges.

Two types of pose range classifiers 440 may be used: one-versus-one classifiers that distinguish between two individual pose ranges (e.g., yaw range 1 and yaw range 4), and one-versus-all classifiers that distinguish between one individual pose range and the remaining pose ranges (e.g., yaw range 2 and yaw ranges {1, 3, 4, 5, 6, 7}). The pose range classifiers 440 may be trained using GentleBoost on Haar-like box features. The output of the pose range classifiers 440 may include the log probability ratio of the face belonging to pose range compared to another. For example, the output of the one-versus-one classifier Yaw: 1-v-2 may be expressed as $\log(p1/p2)$, where p1 stands for the probability of the face belonging to yaw range 1 and p2 stands for the probability of the face belonging to yaw range 2.

The (x, y) coordinates 410 of automatically detected facial features and the real-valued outputs of the pose range classifiers 440 are integrated using a function approximator 450 (e.g., linear regression) to yield an estimate of the head pose Euler angles (yaw, pitch, and roll) 460. In one implementation, the inputs to the function approximator 450 are the raw (x, y) coordinates 410 and the arctangent of the outputs of the pose range classifiers 440 (e.g., $\tan^{-1}(\log(p1/p2))$). In the example illustrated above, the pose detector determines the locations of facial features in the facial image, and then determines the orientation of the head based at least in part on relative locations of the facial features.

Figure 5A:
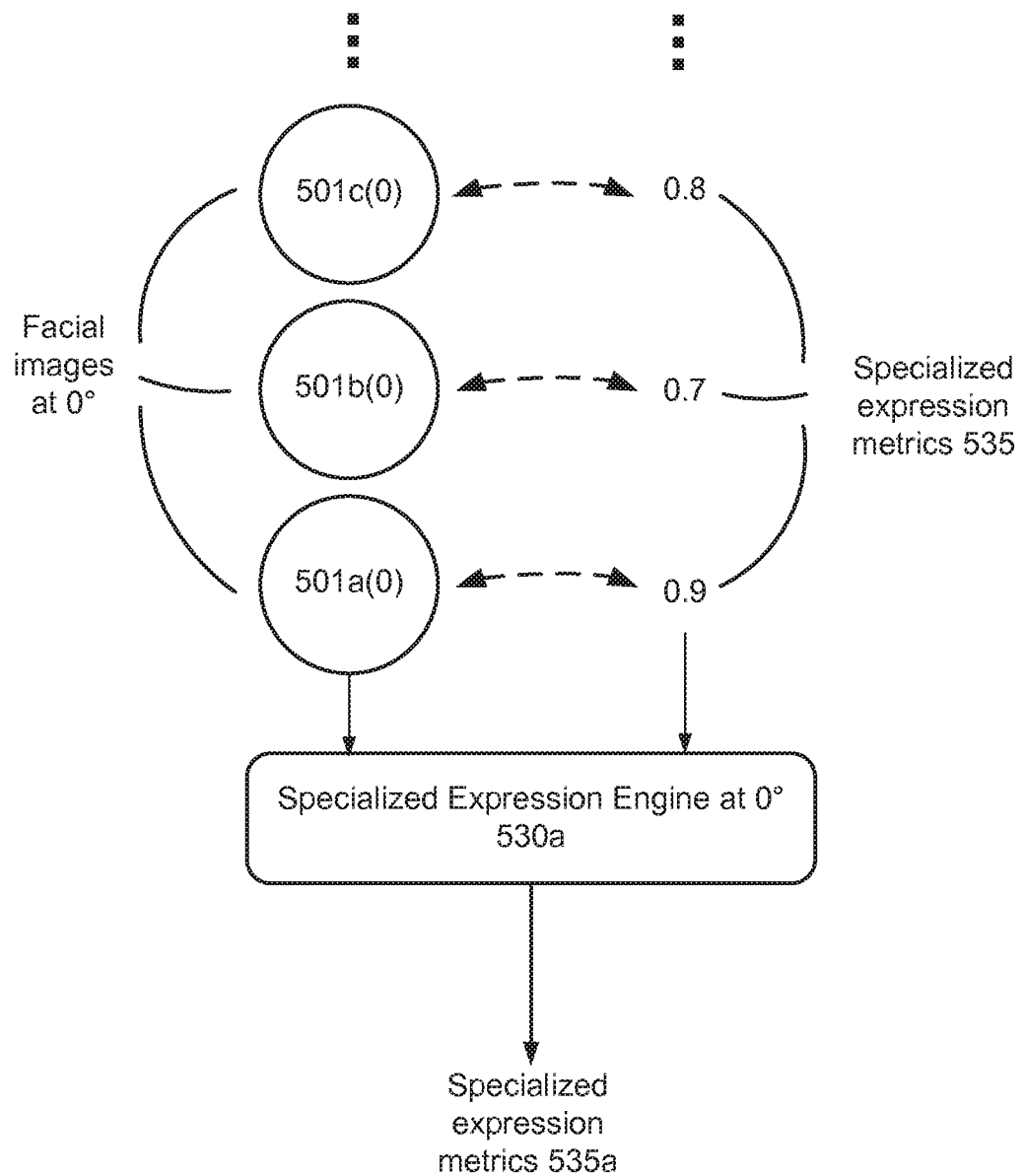
FIGS. 5A-5D illustrate training of the specialized expression engines and the combiner module.

FIGS. 5A-5D illustrate training of the specialized expression engines and the combiner module. FIG. 5A illustrates the training of one specialized expression engine 530a through supervised learning. The specialized expression engine 530a is labeled "at 0°", which means that the specialized expression engine's intended working range is centered at 0° in the yaw space. The intended working range is assumed to be [−5°, +5°] in the yaw space. For purposes of this example, ignore the pitch space and the roll space. The specialized expression engine 530a is trained to be a "frontal view expert" in the yaw space. The meanings for other labels, such as "at +10°", "at −10°", "at +15°", etc., can be similarly inferred.

Facial images 501 together with their corresponding specialized expression metrics 535 form a training set as input to train the specialized expression engine 530. Different facial images are labeled by suffixes: 501a, 501b, 501c, etc. The "0" number in parenthesis indicates the yaw value for the facial image. So image 501a(0) is the facial image 501a taken from a head yaw of 0°. Image 501a(10) is the same facial imago 501a taken from a head yaw of +10°. Image 501b(0) is a different facial image 501b taken from a head yaw of 0°. The specialized expression mettles 535x(y) are the "correct answers" for the facial images 501x(y), and they may be obtained from manual labeling. For example, a human may have manually determined the specialized expression metric 535 for each facial image 501, and the answers are stored in a database for later use in training. A specialized expression metric may simply be a number, such as 0.9, 0.7, or 0.8 as shown in FIG. 5A. In other cases, a specialized expression metric may be a vector of numbers, for example, a vector of scores with each score representing a probability of presence of an action unit. The "correct answers" may also come from another pre-trained expression engine, or from a predefined look-up table.

The specialized expression engine 530a is trained to estimate the correct specialized expression metrics, concentrating on facial images within the intended working range. In one embodiment, the output of the specialized expression engine 530a includes the estimated specialized expression metrics 535a. In many cases, the specialized expression engine 530 includes a parameterized model of the task at hand. The learning process uses the training set to adjust the values of the numerical parameters of the model. The values of the numerical parameters determined by training can then be used in an operational mode.

Figure 5B:
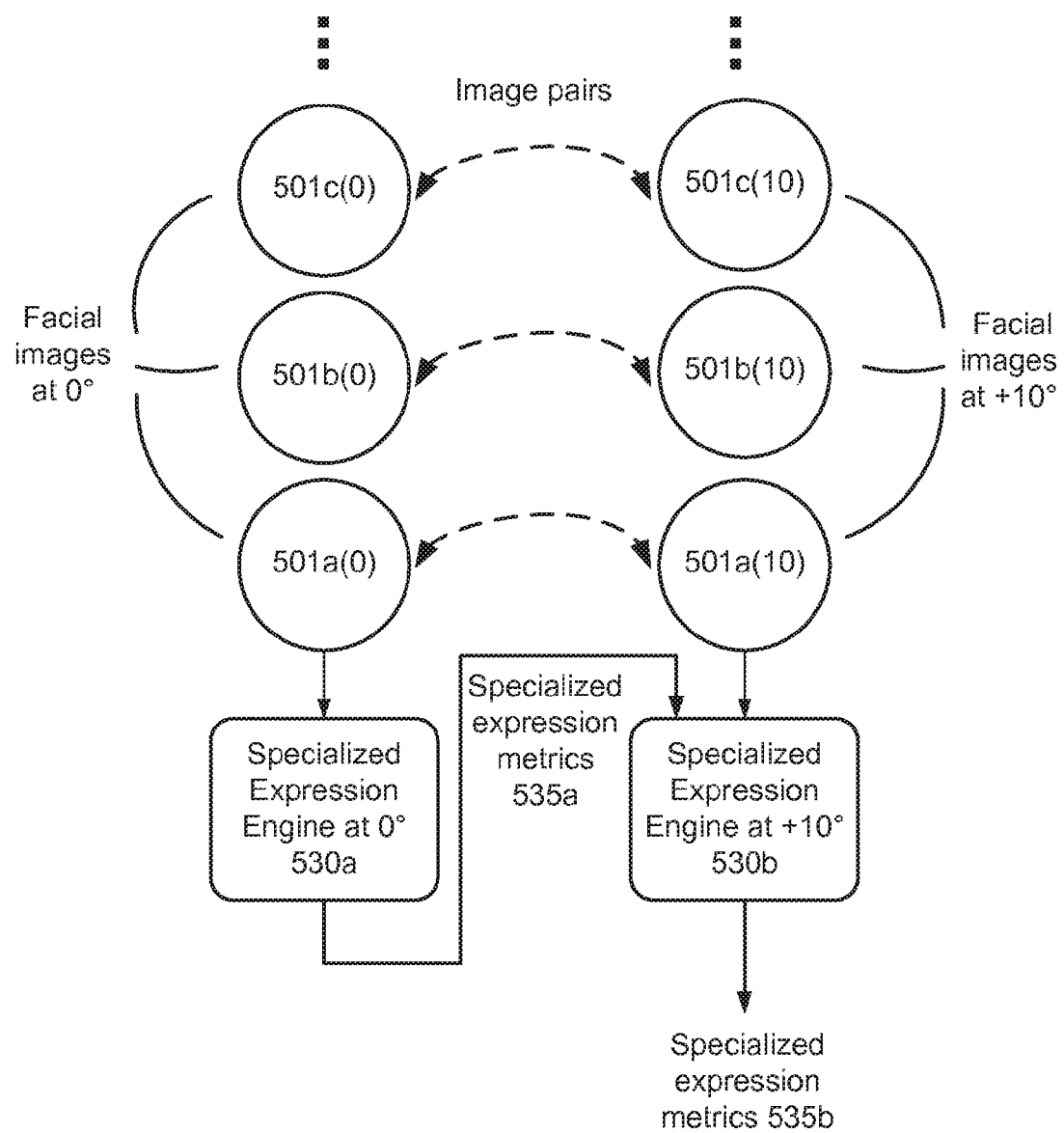

FIG. 5B illustrates the training of a specialized expression engine 530b, based in part on using a previously trained specialized expression engine 530a. In this example, the specialized expression engine 530b (centered at +10° in the yaw space) is being trained through supervised learning. The specialized expression engine 530a (centered at 0° in the yaw space) is already trained, and functions as a teacher to provide the correct answers for the training set. Facial images at 0° (501a(0), 501b(0), 501c(0), etc.) are within the expertise of the specialized expression engine 530a and are input to the specialized expression engine 530a to obtain the corresponding specialized expression metrics 535a, which are assumed to be correct since engine 530a is already trained.

Each facial image at 0° has a corresponding facial image at 10°, and they together form an image pair. For example, the facial image 501a(0) and the facial image 501a(10) form an image pair, the facial image 501b(0) and the facial image 501b(10) form an image pair, and so on. An image pair includes two facial images of the same person with the same facial expression, but with two different orientations of the person's head. Image pairs may be created by taking pictures of a person from two cameras at different angles simultaneously. More generally, image sets may be formed by creating sets of images of the same person with the same facial expression, but taken from different viewpoints (i.e., at different head poses).

The facial images at +10° to with specialized expression metrics 535a form a training set as input to train the specialized expression engine 530b. For example, the facial image 501a(0) is input to the specialized expression engine 530a, and a specialized expression metric 535a is obtained. As the facial image 501a(0) and the facial image 501a(10) form an image pair, they contain the same facial expression. Therefore, the specialized expression metric 535a determined for the facial image 501a(0) is also used as the "correct answer" for the specialized expression metric to be determined from the facial image 501a(10). As a result, the specialized expression metric 535 determined for the facial images 501n(0) in conjunction with the facial image 501n(10) form a training set for the specialized expression engine 530b. In one embodiment, the output of the specialized expression engine 530b includes the estimated specialized expression metrics 535b. This approach can save significant time because it automatically generates training sets for training the non-frontal-view specialized expression engines. In some embodiments, the specialized expression engine 530b may also be trained using a manually labeled training set, e.g., a training set including non-frontal-view facial images conjunction with manually determined specialized expression metrics.

Figure 5C:
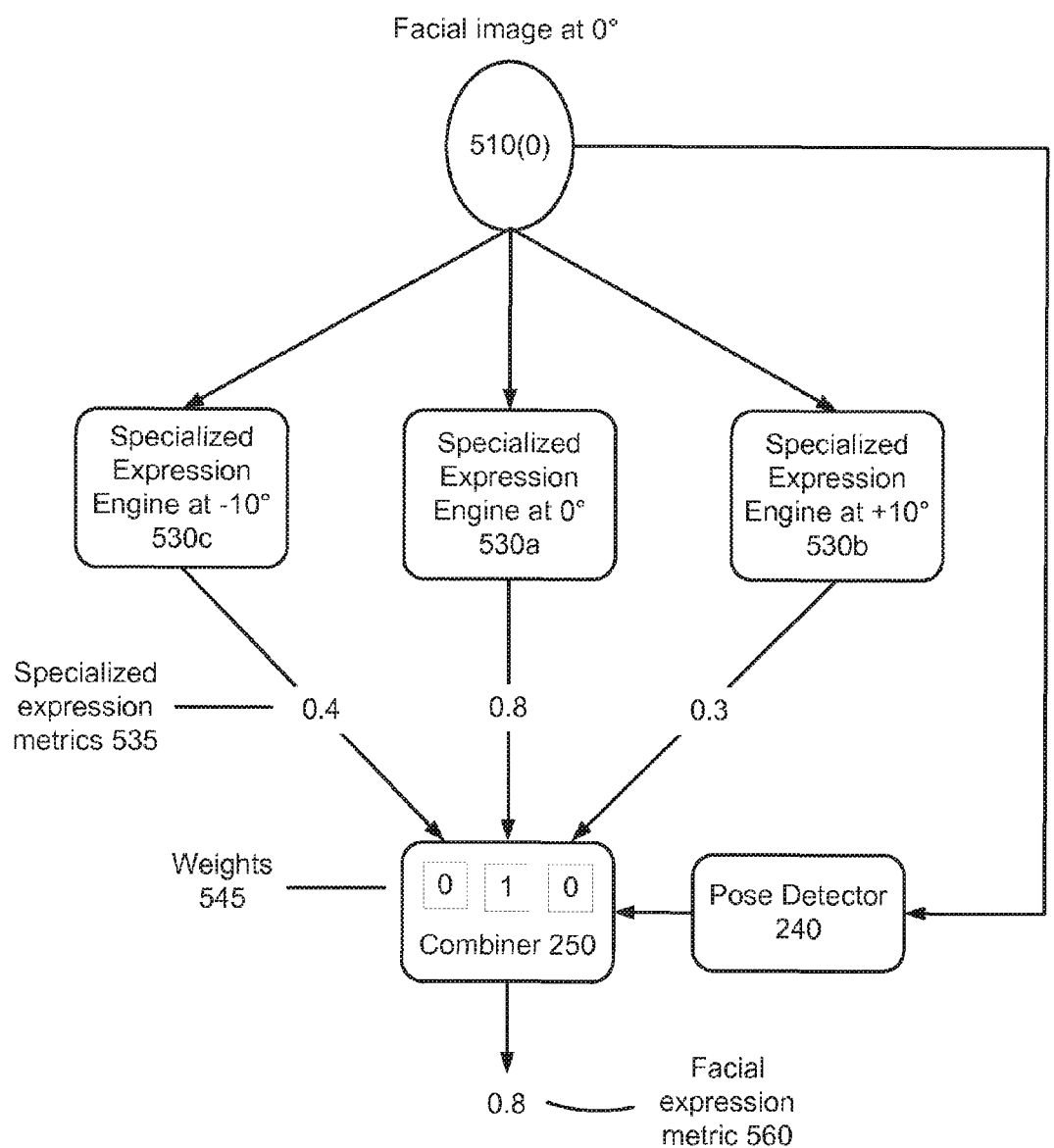
Figure 5D:
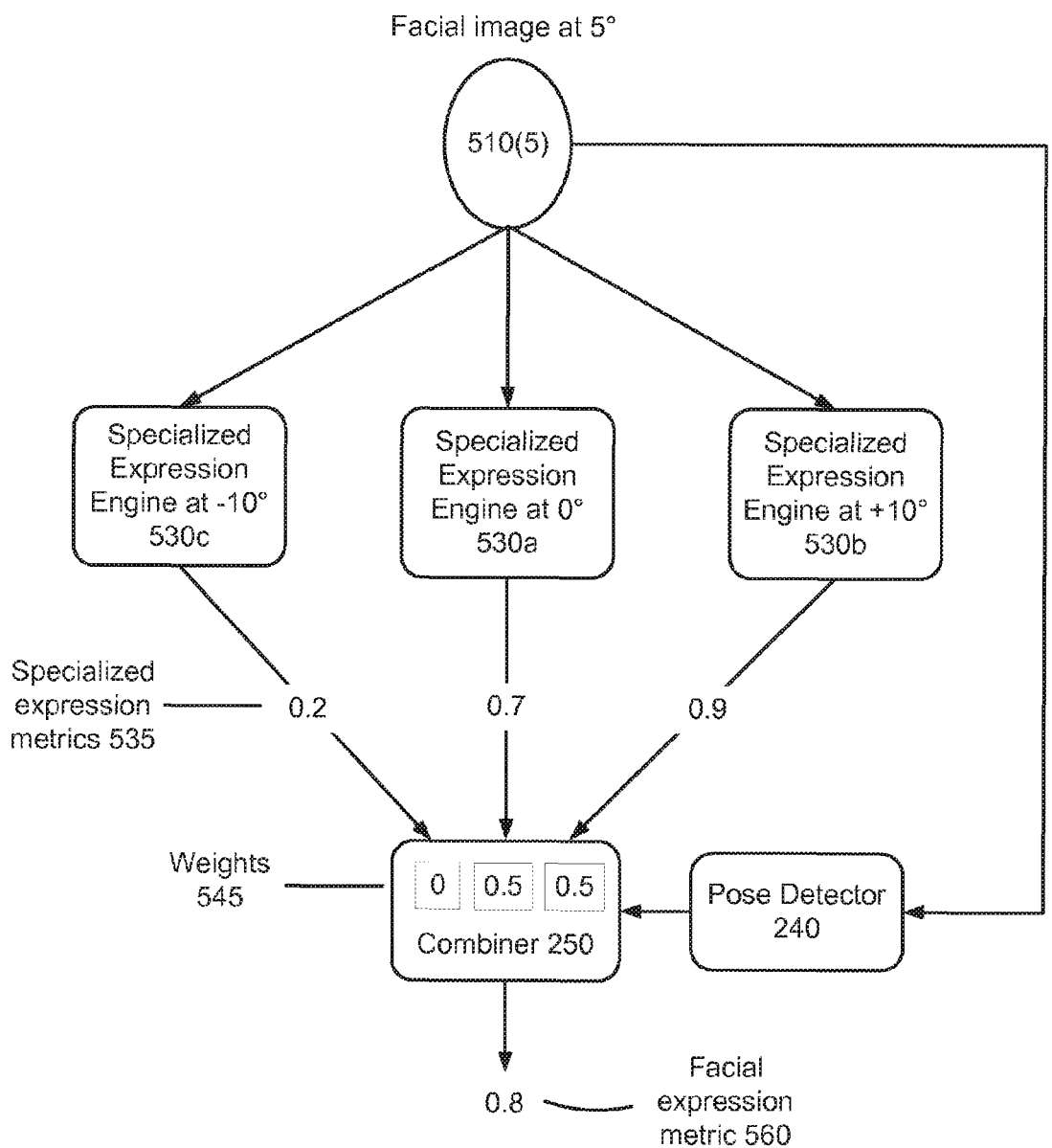

FIGS. 5C-5D illustrate the training of the combiner module using trained specialized expression engines. For illustration purposes, the combiner module 250 is shown to perform a weighted sum of the specialized expression metrics 535. In other embodiments, more sophisticated combination methods may be used. Also, the specialized expression engines 530 (labeled "at 0°", "at +10°", and "at -10°") are examples. In other embodiments, specialized expression engines with more, less, or different expertise ranges may be used. The goal is to train the combiner module 250 to combine the specialized expression metrics to obtain a facial expression metric that is invariant to the head pose.

FIG. 5C illustrates an initial step to train the combiner module. A facial image 510(0) at 0° is input to the specialized expression engines 530 and the pose detector 240. The specialized expression engines are already trained, and each specialized expression engine outputs a specialized expression metric 535 for the facial image 510. As shown in the example of FIG. 5C, the specialized expression metric predicted by the specialized expression engine 530a is 0.8, the specialized expression metric predicted by the specialized expression engine 530b is 0.3, and the specialized expression metric predicted by the specialized expression engine 530c is 0.4. These specialized expression metrics 535 are to be combined by the combiner module 250. In this example, the combiner module 250 uses information from the pose detector 240 to determine a set of weights 545 for combining the specialized expression metrics 535. As shown in FIG. 5C, the pose detector 240 determines the facial image 510 to be "at 0°" (i.e., exactly a frontal view image), and sends the information to the combiner module 250. Since facial image 510(0) is for an orientation that exactly matches the expertise of specialized expression engine 530a, the combiner module 250 uses a pre-determined weight distribution for frontal view images to initialize the facial expression metric 560. For example, the pre-determined weight distribution may be the weights 545 shown in FIG. 5C, namely, 1 for the specialized expression engine at 0° and 0 for the specialized expression engines at -10° and at +10°. The facial expression metric 560 obtained using such a weighted sum is 0.8 (=0.4*0+0.8*1+0.3*0). In other words, the system deems the frontal view images and the frontal view experts to be trustworthy, and uses them to determine the "correct answer" for the facial expression metric 560. In other embodiments, more sophisticated methods for determining the correct facial expression metric may be used.

FIG. 5D illustrates a subsequent training step of the combiner module 250. In this example, a facial image 510(5) at 5° is input to the specialized expression engines 530 and the pose detector 240. The facial image 510(5) and the facial image 510(0) form an image pair. For a head-pose invariant expression engine, the same facial expression metric (0.8) should be obtained at the output. As shown in FIG. 5D, a different set of specialized expression metrics 535 are obtained (0.2 for the specialized expression engine at -10°, 0.7 for the specialized expression engine at 0°, 0.9 for the specialized expression engine at +10°). The pose detector 240 determines the facial image 510(5) to be "at 5°" (i.e., a non-frontal view image), and sends the information to the combiner module 250. In one approach, the pose detector 240 determines the head orientation Euler angles (yaw, pitch, roll) in the facial image 510(5), and sends the Euler angles to the combiner module 250.

In one embodiment, the combiner module 250 uses the Euler angles determined by the pose detector 240 to assign weights to the specialized expression metrics. For example, if the Euler angles are ($\alpha$, $\beta$, $\gamma$), the combiner module 250 assigns higher weights to the specialized expression metrics predicted by the specialized expression engines whose intended working ranges are near ($\alpha$, $\beta$, $\gamma$), and lower weights to other specialized expression metrics. The combiner module 250 then tunes the weights 545 based on the assumed "correct answer" for the facial expression metric 560 determined for the frontal view case in FIG. 5C. In the example shown in FIG. 5D, the weights 545 are determined to be 0, 0.5, 0.5, such that a weighted sum gives 0.8 (=0*0.2+0.5*0.7+0.5*0.9) for the facial expression metric 560, which is equal to the facial expression metric of FIG. 5C. The training of the combiner module continues with many image pairs. For example, image pairs may be selected to train over the desired range of head poses.

After the individual trainings of the specialized expression engines and the combiner module are completed, the expression engine as a whole (including the specialized expression engines and the combiner module) can be further trained to improve performance. Standard optimization algorithms (e.g., gradient descent) can be used to further optimize the parameters in the specialized expression engines as well as the parameters in the combiner module. In addition, the parameters of the expression engine may be iteratively optimized. For example, the parameters in the combiner module may be optimized while the parameters in the specialized expression engines are fixed; and then the latter are optimized while the former are fixed. In some cases, the intended working ranges of specialized expression engines may be further optimized. For example, some specialized expression engines may enlarge, narrow, and/or shift their intended working ranges during the course of the training to optimize the overall performance of the expression engine.

Figure 6:
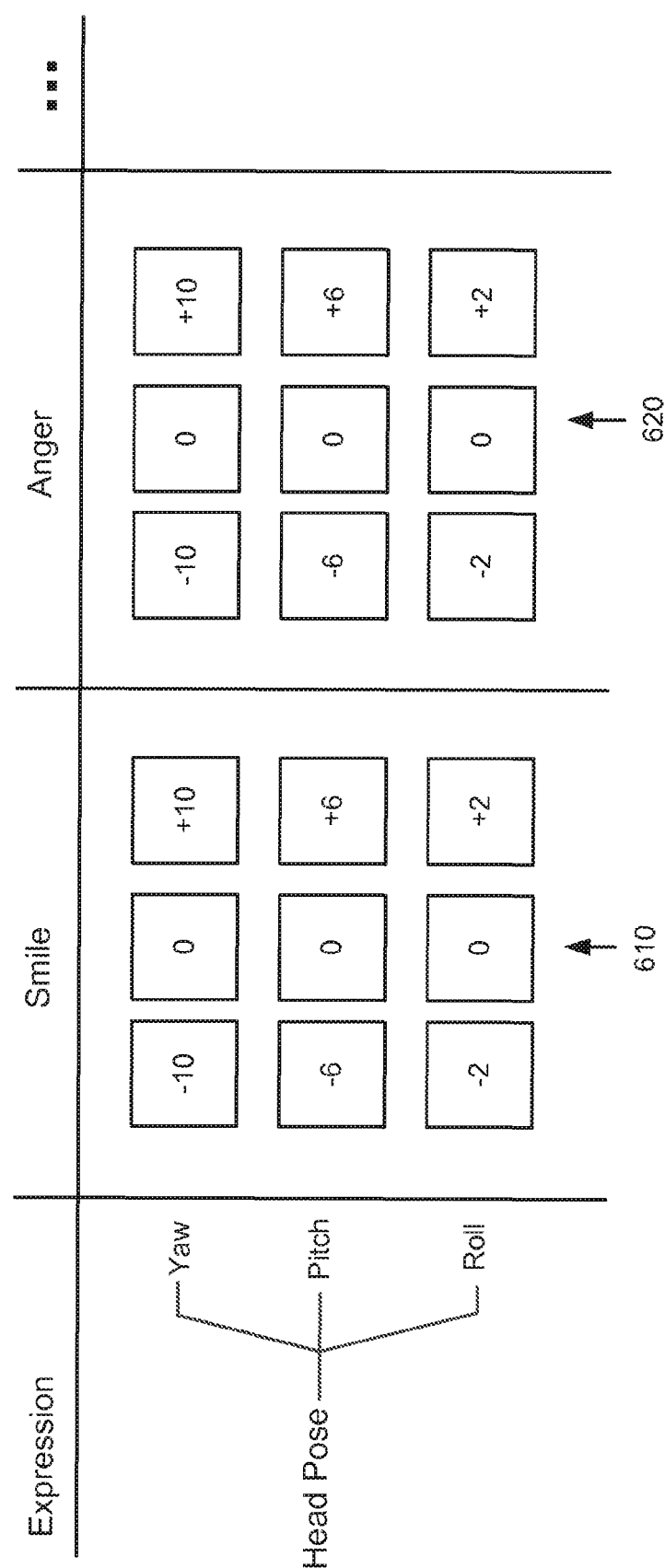
FIG. 6 illustrates an example set of specialized expression engines.

FIG. 6 illustrates an example set of specialized expression engines. The specialized expression engines illustrated in FIG. 6 are pose-specific expression engines. In other cases, the specialized expression engines are not limited to specific head poses. For instance, the specialized expression engines may specialize in certain facial features and/or certain action units. In addition, the specialized expression engines may specialize in a certain gender (e.g., male or female). In the example shown in FIG. 6, the specialized expression engines are categorized by expression and by head pose (yaw, pitch, roll). For example, there are specialized smile engines 610, specialized anger engines 620, etc. Other specialized expression engines may include specialized surprise engines, specialized confusion engines, and so on. The specialized smile engines 610 are further classified by their assumed head orientations (i.e., nominal orientations). An example set is shown in FIG. 6. The head poses are discretized in the yaw, pitch, and roll dimensions. The discretizations may be different in these dimensions. In some cases, one or more dimensions may not be discretized at all.

For instance, each square in FIG. 6 represents a center of discretization in a head-pose dimension. For example, the yaw dimension has a discretization step of 10°, the pitch dimension has a discretization step of 6°, and the roll dimension has a discretization step of 2°. A specialized expression engine may be labeled by combining the expression and the head pose discretization center, such as Smile-(0, 0, 0), Anger-(−10, −6, +2), etc. The head pose discretization center of a specialized expression engine is the assumed head orientation for that specialized expression engine. For example, the Smile-(0, 0, 0) specialized expression engine is specialized in detecting smile assuming the head orientation to be (0, 0, 0).

Each specialized expression engine may also have an intended working range. For example, the Smile-(0, 0, 0) specialized expression engine may have a yaw range of [−5°, +5°], a pitch range of [−3°, +3°], and a roll range of [−1°, +1°]. The working ranges of the specialized expression engines typically fill the yaw-pitch-roll space with minimal overlap, but this is not required. In an alternate embodiment, roll may be accounted for by rotating the facial image to a 0° roll position and then using specialized expression engines to account for yaw and pitch.

In another embodiment, the specialized expression engines are categorized only by head pose. In other words, these specialized expression engines are expression-multiplexed versions of their counterparts shown in FIG. 6. These specialized expression engines are labeled as (0, 0, 0), (−10, −6, +2), etc. Each specialized expression engine is able to output a vector instead of a single number. The vector output may have multiple components, one component representing the probability/intensity of smile present in the facial image, another component representing the probability/intensity of anger present in the facial image, and the like. In one approach, each component of the output vector corresponds to the probability of the presence of an action unit in the facial image.

Figure 7:
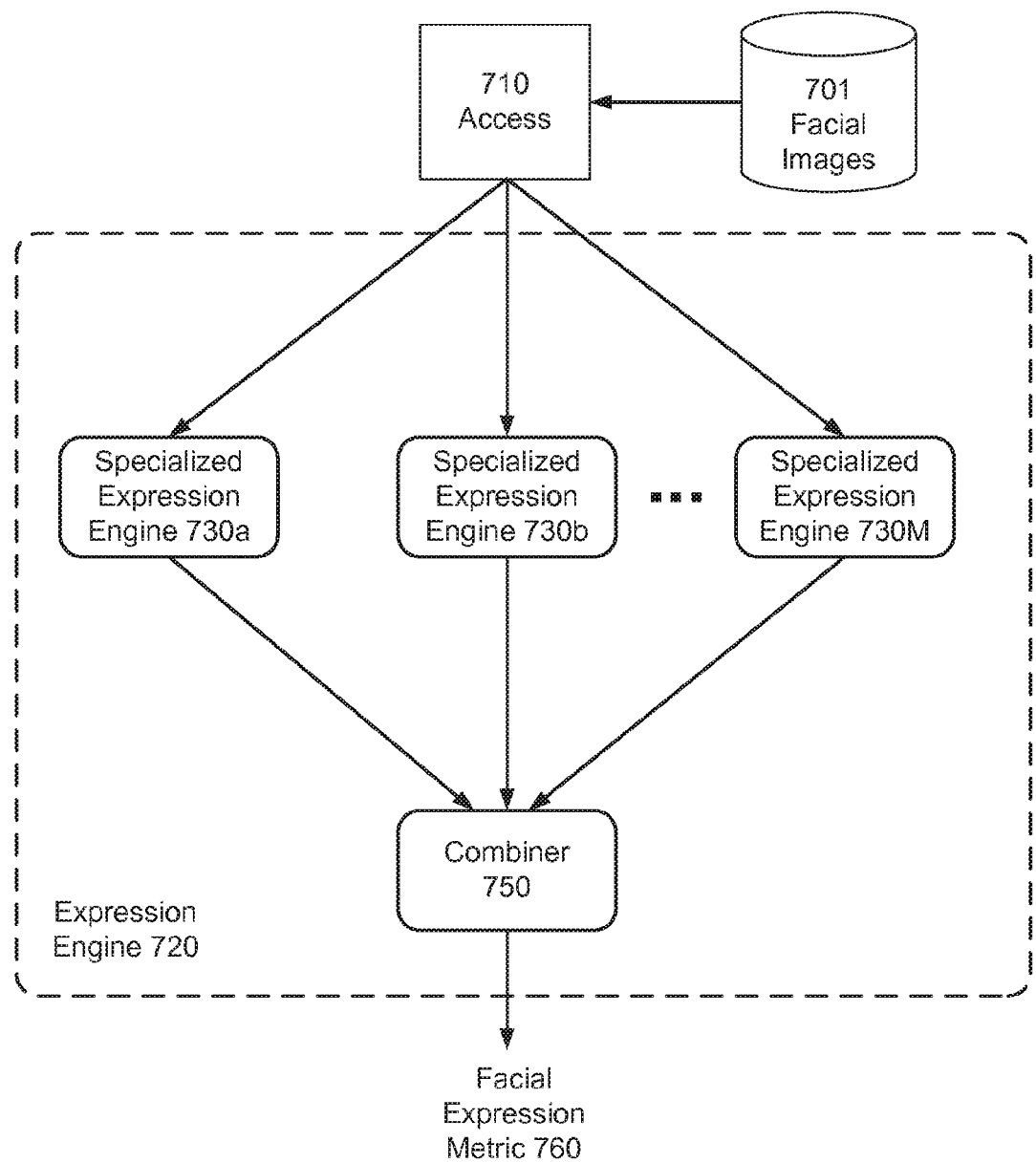
FIG. 7 is a block diagram of a system for automatically recognizing facial expressions without using a pose detector.

FIG. 7 is a block diagram illustrating a system for automatically recognizing facial expressions. This system is similar to the one shown in FIG. 1, but without using a pose detector and without using the facial image as an input to the combiner 750. This system can be trained using the same approach as shown in FIGS. 5A-5D, but facial imps 701 are not input to the combiner module 750 as part of training. Rather, a facial image is applied to the previously trained specialized expression engines 730a-M. Each specialized expression engine produces a corresponding specialized expression metric. The training set for the combiner module 750 then includes these specialized expression metrics and the known "correct" facial expression metric 760, determined the same way as described in FIGS. 5A-5D using image pairs.

Figure 8:
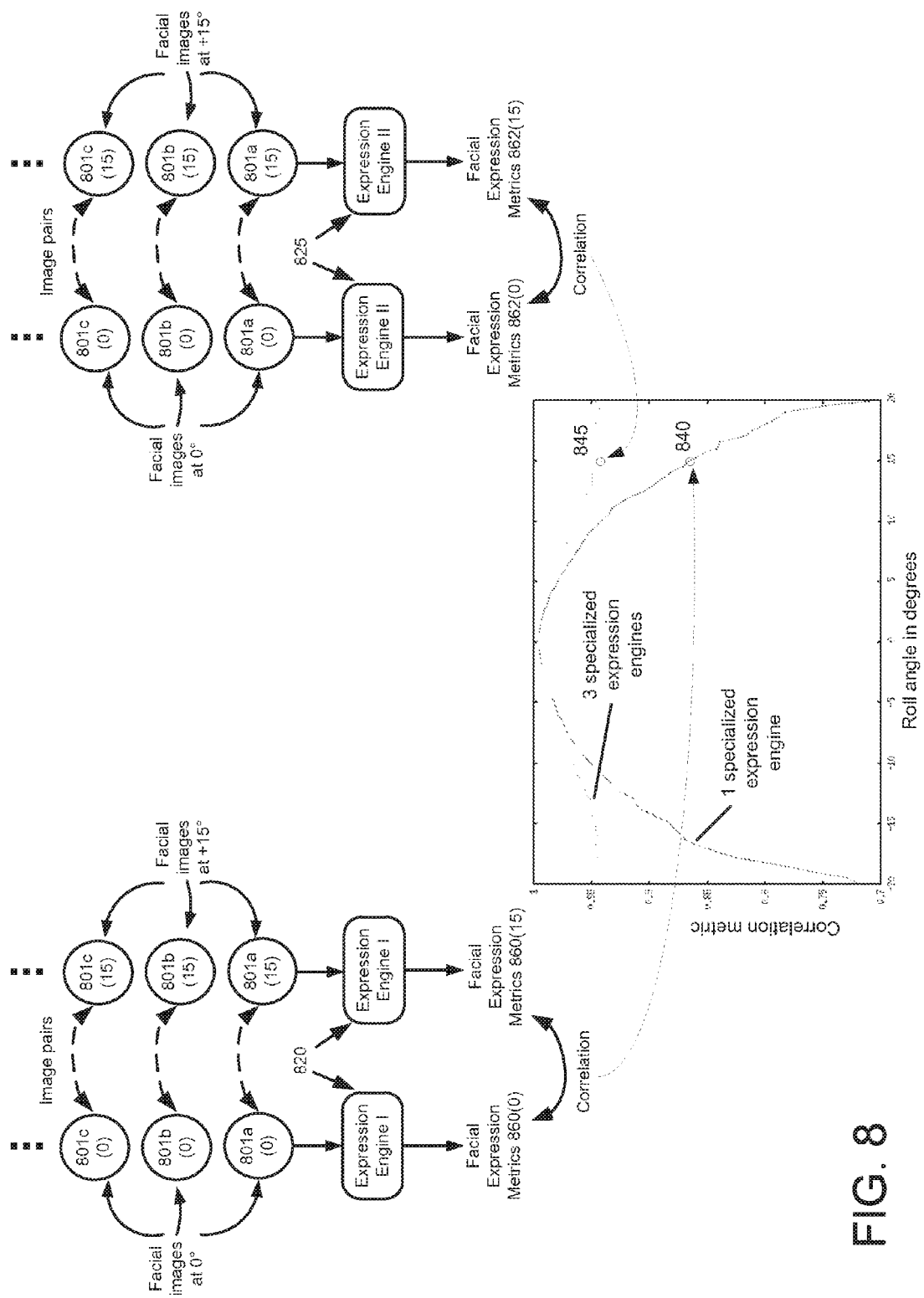
FIG. 8 illustrates an example comparison between two systems for recognizing facial expressions, one system having three specialized expression engines and the other system having one specialized expression engine.

FIG. 8 illustrates an example comparison between two systems for recognizing facial expressions. Expression engine I 820 is a system that has one specialized expression engine with a working range of [−15°, +15°] in the roll space. Expression engine II 825 is a system having three specialized expression engines, with working ranges of [−15°, −5°], [−10°, +10°], and [+5°, +15°] in the roll space. Image pairs are input to both systems, and correlation metrics between the facial expression metrics of the image pairs are calculated and plotted.

The plot in the middle of FIG. 8 shows such a "correlation plot." The x-axis is the roll angle in degrees, and the y-axis is the correlation metric. In one approach, the correlation metric is represented by the Pearson correlation coefficient. The upper curve is correlation vs. roll angle for expression engine II, and the lower curve is correlation vs. roll angle for expression engine I.

For clarity of illustration, consider one specific roll angle on the curve. The point 840 is taken from the lower curve and the point 845 is taken from the upper curve. Both points correspond to a 15° roll angle. To obtain the correlation metric (i.e., y-value) of the point 840, a set of facial images at 0° roll angle $\{801a(0), 801b(0), 801c(0), \ldots\}$ is input to the expression engine I to obtain a set of facial expression metrics 860(0). A corresponding set of facial images at 15° roll angle $\{801a(15), 801b(15), 801c(15), \ldots\}$ is also input to the expression engine I to obtain another set of facial expression metrics 860(15). The two sets of facial images form a set of image pairs. For example, the image 801a(0) and the image 801a(15) form an image pair, the image 801b(0) and the image 801b(15) form an image pair, and so on. The Pearson correlation coefficient between the set of facial expression metrics 860(0) and the set of facial expression metrics 860(15) is then calculated to obtain the vertical coordinate of the point 840. The process is shown in the left part of FIG. 8.

The y-value of the point 845 is obtained in a similar fashion. As shown in the right part of FIG. 8, a set of facial images at 0° roll angle $\{801a(0), 801b(0), 801c(0), \ldots\}$ is input to the expression engine II to obtain a set of facial expression metrics 862(0). A corresponding set of facial images at 15° roll angle $\{801a(15), 801b(15), 801c(15), \ldots\}$ is also input to the expression engine II to obtain another set of facial expression metrics 862(15). The two sets of facial images form a set of image pairs. This set of image pairs may be the same set of image pairs used in calculating the point 840. In some cases, the two sets of image pairs may be different. The Pearson correlation coefficient between the set of facial expression metrics 862(0) and the set of facial expression metrics 862(15) is then calculated to obtain the vertical coordinate of the point 845.

A correlation value of 1 indicates perfect correlation. For example, the points at the center of the two curves (corresponding to a roll angle of 0°) in the correlation plot always have correlation values of 1, because the set of facial expression metrics at 0° always have a perfect correlation with itself. On the other hand, a correlation value of 0 indicates no correlation at all. For example, two sets of random numbers have a correlation value of 0, because they have no correlation with each other. A correlation value between facial expression metrics at 0° and a non-frontal head pose greater than 0.9 across a range of [−20°, 20°] in the roll space is an indication of head-pose invariance, because the predictions of facial expression metrics at the non-frontal head pose within the above range always follow the predictions of the corresponding facial expression metrics at the frontal head pose to a great extent. As shown in FIG. 8, the point 845 has a higher correlation than the point 840, indicating that expression engine II (with 3 specialized expression engines) is more capable of making head pose invariant predictions than expression engine I (with only one specialized expression engine). Another indication of head-pose invariance is when the facial expression metric does not vary by more than 20% for orientations of the head ranging across [−20°, 20°] in at least one of the Euler angles (yaw, pitch). Alternately, the distance between the frontal and non-frontal head poses may be characterized using other measures, for example some combination of Euler angles or the quaternion distance, and an indication for head-pose invariance in each case can be similarly defined.

In a typical implementation or the expression engine, the number of specialized expression engines is between 16 and 49, for example more than 15 and less than 50. These specialized expression engines may be uniformly spaced in the Euler angles (yaw, pitch). In one particular design, each specialized expression engine is designed to operate over a range of +/−10 degrees in (yaw, pitch) relative to its nominal orientation. The nominal orientations are spaced by 5 degrees so that neighboring specialized expression engines overlap in their intended ranges of expertise. In some cases, the optimal number of specialized expression engines in an expression engine varies in proportion to the amount of available training data.

In alternate embodiments, the invention is implemented in computer hardware, firmware, software, and/or combinations thereof. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical and CD-ROM disks. Any of the foregoing can be supplemented by, or incorporated in, ASICs (application-specific integrated circuits) and other forms of hardware.

The term "module" is not meant to be limited to a specific physical form. Depending on the specific application, modules can be implemented as hardware, firmware, software, and/or combinations of these, although in these embodiments they are most likely software. Furthermore, different modules can share common components or even be implemented by the same components. There may or may not be a clear boundary between different modules.

Depending on the form of the modules, the "coupling" between modules may also take different forms. Software "coupling" can occur by any number of ways to pass information between software components (or between software and hardware, if that is the case). The term "coupling" is meant to include all of these and is not meant to be limited to a hardwired permanent connection between two components. In addition, there may be intervening elements. For example, when two elements are described as being coupled to each other, this does not imply that the elements are directly coupled to each other nor does it preclude the use of other elements between the two.

Although the detailed description contains many specifics, these should not be construed as limiting the scope of the invention but merely as illustrating different examples and aspects of the invention. It should be appreciated that the scope of the invention includes other embodiments not discussed in detail above. For example, the expression engine may further include a gender detection module, and the detected gender information of the facial image may be used in combination with the determined head orientation to obtain the facial expression metric. In some embodiments, the specialized expression engines are not pre-trained. In other embodiments, the specialized expression engines do not nave a continuous range of expertise. For instance, a specialized expression engine may "cluster specialize" and have a discontinuous range of expertise covering both [−15°, −10°] and [+10°, +15°] in the yaw space.

The architectures described above may be implemented in a number of ways. For example, the architecture may be defined in advance, where each specialized expression engine is assigned a specific range of head poses and then designed (e.g., trained) for that assigned range. Alternately, the system may start out as a more generic machine learning architecture, such as a deep learning architecture, which during training self-organizes into an architecture with specialized expression engines that are specialized for different ranges of head poses. The ranges may also be non-uniform, for example if the machine learns that finer sampling of head poses is beneficial over certain ranges or that coarser sampling can be tolerated over certain ranges.

As another example, the description above was for determining facial expression in a manner that is substantially invariant to the orientation of the head. In other applications, other attributes of the facial image or of the subject can be determined in a manner that is substantially invariant to the orientation of the head. Examples of other attributes include age, gender, race and ethnicity.

For example, consider the case of determining ethnicity. The example described above can be modified by replacing facial expression with ethnicity. In FIG. 2, the expression engine 220 would be an ethnicity engine that determines an ethnicity of the subject, for example by using an ethnicity metric instead of the facial expression metric 260. Each specialized expression engine 230a-N is trained to recognize ethnicity over a narrow range of head poses. As such, they may be referred to as specialized ethnicity engines, rather than specialized expression engines. The output of each may be referred to as a specialized ethnicity metric. The combiner module 250 combines these into the overall ethnicity metric. The pose detector of FIG. 4 may be used in the same fashion as for recognizing facial expressions. The training approach described in FIGS. 5A-5D may also be used to train the specialized ethnicity engines. The architecture of FIG. 6 may also be applied to ethnicity, by replacing the expressions along the top row with different ethnicities to be recognized. The architecture shown in FIG. 7, which does not use a pose detector, can also be adapted to recognize ethnicity.

In this way, the approaches described above can be modified to recognize preselected attributes which are reflected in facial images. Specialized recognition engines are each trained to recognize the desired attribute over a narrow range of head poses, for example by outputting a specialized recognition metric. A combiner module may then combines these specialized metrics to produce an overall recognition metric that is indicative of the preselected attribute but is substantially invariant to head orientation.

Further examples of attributes of interest may include income or wealth of the subject, lifestyle attributes of the subject (how much time spent outdoors, whether the subject has a manual labor job or a sedentary desk job, etc.), health attributes of the subject (whether overweight, under a lot of stress, getting adequate nutrition and/or sleep, etc.), and personality attributes of the subject (whether trustworthy, creative, greedy, loyal, helpful, kind, religious, optimistic, etc.). The facial images may be captured under special circumstances designed to probe for certain attributes. For example, if the attribute is trustworthiness, the subject may be asked a series of questions designed to elicit different facial responses from trustworthy and non-trustworthy subjects, with the facial images captured during the questioning. If the attribute is social conservativeness, the subject may be asked a series of questions that become progressively more embarrassing. Socially conservative subjects may become more uncomfortable during questioning, which can be reflected in their facial images.

Figure 9A:
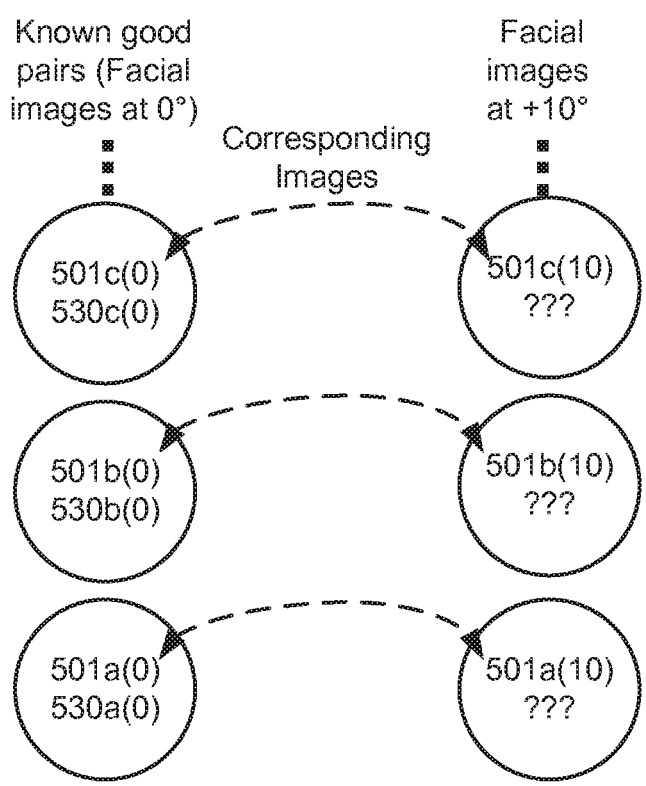
FIGS. 9A-9B illustrate creating training sets from known good pairs.

In another aspect, training sets for the specialized recognition engines are created by taking advantage of known good pairs, as previously described above and as shown in FIGS. 9A-9C. The left column of FIG. 9A shows known good pairs of frontal view facial images $501x(0)$ and their corresponding metrics $530x(0)$. That is, $501a(0)$ is one frontal view facial image and $530a(0)$ is the corresponding specialized recognition metric; $501b(0)$ is another frontal view facial image and $530b(0)$ is the corresponding metric; $501c(0)$ is a third frontal view facial image and $530c(0)$ is the corresponding metric, and so on. These are known good pairs because the metrics $530x(0)$ are taken as true values, for example they may be the output of a previously trained engine. For convenience, these facial images $501x(0)$ will be referred to as known good facial images and the corresponding metrics $530x(0)$ as known good specialized recognition metrics or simply known good metrics.

The right column of FIG. 9A shows facial images $501x(10)$ of the same head, but taken from a head yaw of +10°. For example, facial image $501a(10)$ is the same head with the same attribute as facial image $501a(0)$, but taken from a different viewpoint. These facial images may fall within the range of head poses for a specialized recognition engine (e.g., one designed for a range around +10°) and therefore would be good training samples if the corresponding specialized recognition metrics were also known. However, they are not known, as indicated by the ??? in FIG. 9A. The specialized recognition metric is then derived from the corresponding known good specialized recognition metric. For example, the metric for the right-looking facial image $501a(10)$ may be taken to be the same as the metric $530a(0)$ for the known good frontal view $501a$ (0) since it is known that both facial images $501a(0)$ and $501a(10)$ exhibit the same attribute. In this way, a training set for supervised learning can be created.

Figure 9B:
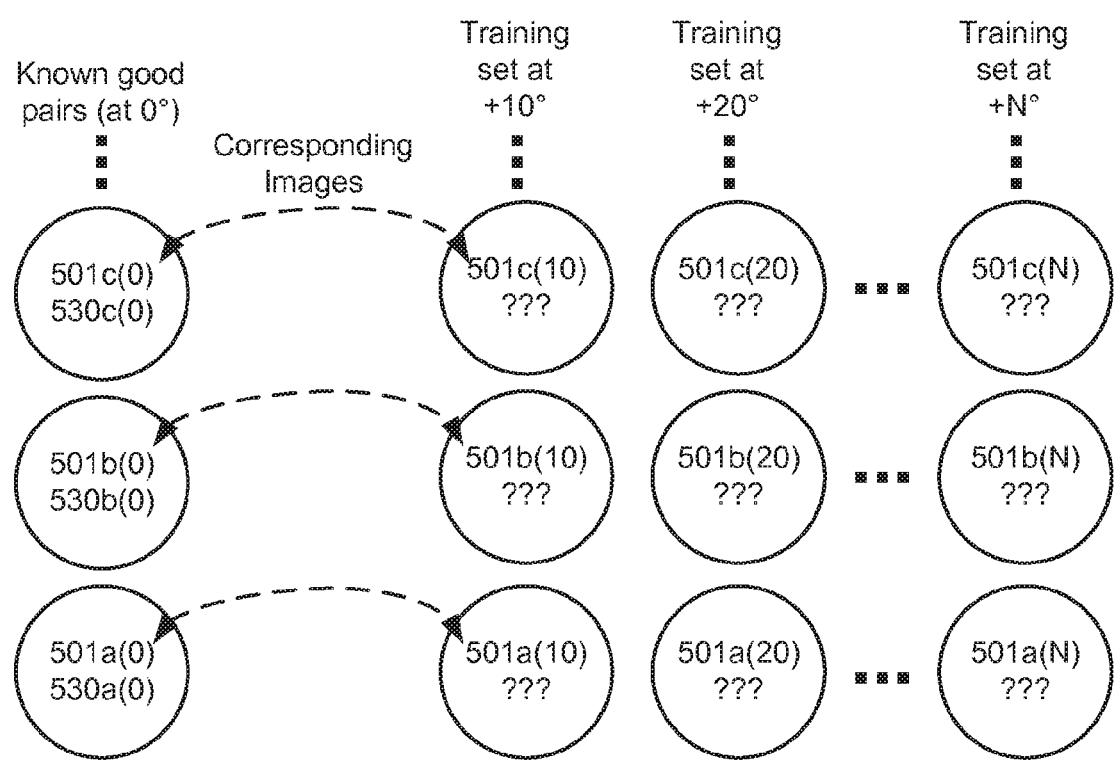

FIG. 9B is an example where the same set of known good pairs is used to create multiple training sets. In this example, the known good facial image $501x(0)$ has multiple corresponding facial images captured from different viewpoints: $501x(10)$, $501x(20)$, etc. The pairs of known good facial image $501x(0)$ and known good specialized recognition metric $530x(0)$ can then be used to estimate the specialized recognition metrics $530x(*)$ for each of the corresponding facial images $510x(*)$. In this way, multiple training sets can be created.

Figure 9C:
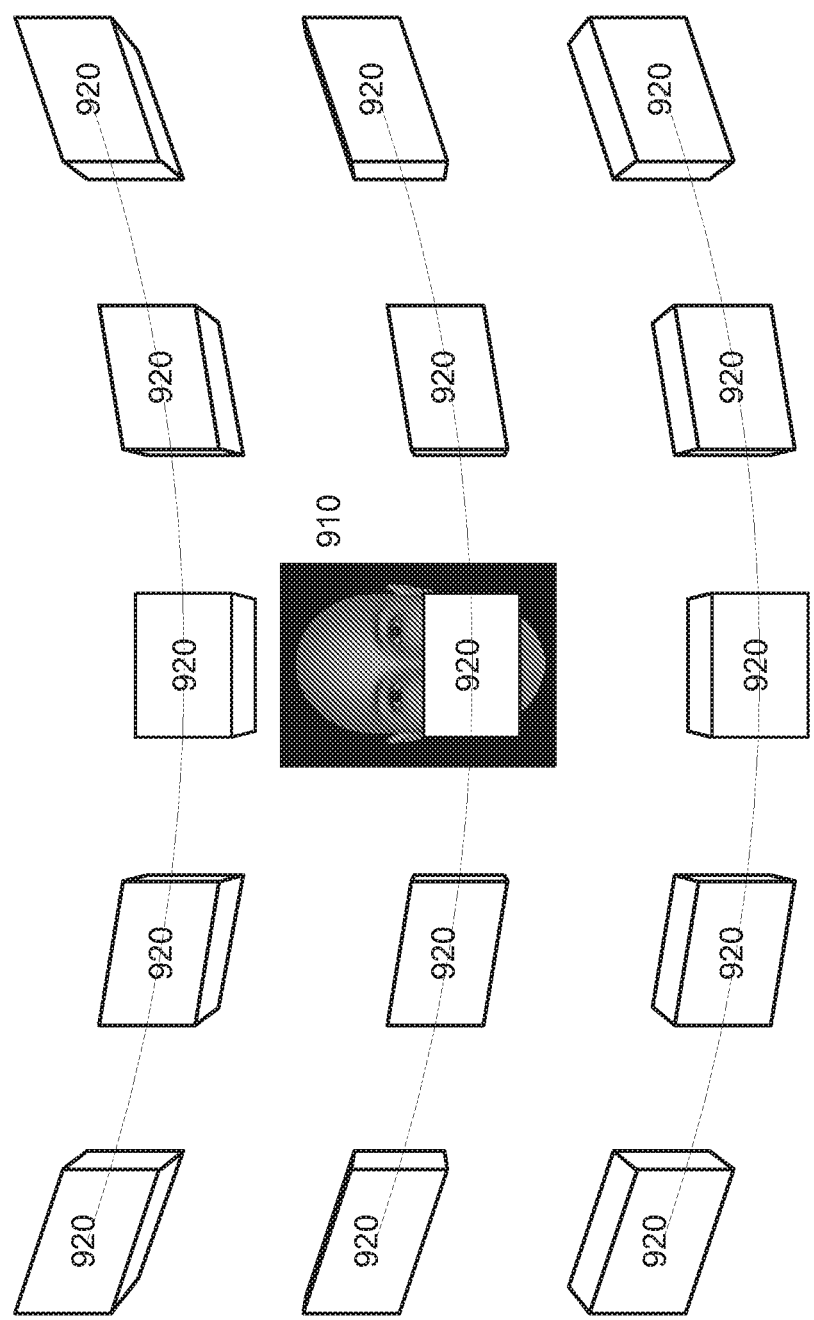
FIG. 9C is a diagram of a multi-camera system that simultaneously captures different head poses.

FIG. 9C is a diagram of a system for simultaneously capturing facial images from multiple different viewpoints. The subject 910 is photographed multiple cameras 920, which in this example are arranged in a 5×3 matrix. Each camera 920 captures a facial image from a different viewpoint. In this example, the different head poses are created not by the head moving to different orientations with respect to the camera but by the cameras having different orientations with respect to the head. These different head poses can be used to create training sets, as described above.

Various other modifications, changes and variations which will be apparent to those skilled in the art may be made in the arrangement, operation and details of the method and apparatus of the present invention disclosed herein without departing from the spirit and scope of the invention as defined in the appended claims. Therefore, the scope of the invention should be determined by the appended claims and their legal equivalents.

What is claimed is:

1. A computer-implemented method for training a combination engine for facial recognition, the method comprising:
   receiving a first training facial image of a head from a plurality of training facial images, the first training facial image having a preselected attribute within a first range of head poses associated with a set of specialized recognition engines (SREs);
   receiving a first set of specialized recognition metrics (SRMs) associated with the first training facial image, each SRM of the first set of SRMs associated with a SRE of the set of SREs;
   receiving first head pose information for the first training facial image;
   determining a first facial expression metric based on the first set of SRMs and the received first head pose information;
   associating the first facial expression metric with the received first head pose information.

2. The computer implemented method of claim 1, wherein the received first head pose information includes an indication that a head pose of the first training facial image is within a range associated with a SRE of the set of SREs.

3. The computer-implemented method of claim 1, wherein each SRM of the first set of SRMs is an indication of a facial expression of the first facial image assuming a specific orientation of the head, and each SRM corresponds to different orientations of the head.

4. The computer-implemented method of claim 1, wherein the first range of head poses associated with each SRM spans within ten degrees with respect to at least one of Euler angles (yaw, pitch, roll).

5. The computer implemented method of claim 1, further comprising:
receiving a second training facial image from the plurality of training facial images, the second training facial image having the preselected attribute, and having a second range of head poses associated with the set of SREs, the second range of head poses different from the first range of head poses;
receiving second head pose information; and
determining a second facial expression metric based on a second set of SRMs and the received second head pose information, the second facial expression metric equal to the first facial expression metric.

6. The computer-implemented method of claim 5, wherein the head pose for the second facial image differs by at least five degrees from the head pose for the first facial image.

7. The computer-implemented method of claim 5, further comprising determining a set of weights for the second set of SRMs, wherein the determined set of weights is based on the first facial expression metric.

8. The computer-implemented method of claim 1, wherein the determining the first facial expression metric is based on weights assigned to each SRM of the first set of SRMs based on the received first head pose information.

9. The computer-implemented method of claim 8, wherein the weights are assigned based, at least in part, on how closely received first head pose information matches an orientation corresponding to the first range of head poses associated with each SRM of the first set of SRMs.

10. The computer-implemented method of claim 9, wherein the facial metric is based on the weighted sum of each SRM of the first set of SRMs.

11. A non-transitory computer readable medium containing instructions that, when executed by a processor, cause a programmable device to:
receive a first training facial image of a head from a plurality of training facial images, the first training facial image having a preselected attribute within a first range of head poses associated with a set of specialized recognition engines (SREs);
receive a first set of specialized recognition metrics (SRMs) associated with the first training facial image, each SRM of the first set of SRMs associated with a SRE of the set of SREs;
receive first head pose information for the first training facial image;
determine a first facial expression metric based on the first set of SRMs and the received first head pose information;
associate the first facial expression metric with the received first head pose information.

12. The computer readable medium of claim 11, wherein the received first head pose information includes an indication that a head pose of the first training facial image is within a range associated with a SRE of the set of SREs.

13. The computer readable medium of claim 11, wherein each SRM of the first set of SRMs is an indication of a facial expression of the first facial image assuming a specific orientation of the head, and each SRM corresponds to different orientations of the head.

14. The computer readable medium of claim 11, wherein the first range of head poses associated with each SRM spans within ten degrees with respect to at least one of Euler angles (yaw, pitch, roll).

15. The computer readable medium of claim 11, wherein the instructions further comprise instructions that when executed cause the programmable device to:
receive a second training facial image from the plurality of training facial images, the second training facial image having the preselected attribute, and having a second range of head poses associated with the set of SREs, the second range of head poses different from the first range of head poses;
receive second head pose information; and
determine a second facial expression metric based on a second set of SRMs and the received second head pose information, the second facial expression metric equal to the first facial expression metric.

16. The computer readable medium of claim 15, wherein the head pose for the second facial image differs by at least five degrees from the head pose for the first facial image.

17. The computer readable medium of claim 15, wherein the instructions further comprise instructions that when executed cause the programmable device to determine a set of weights for the second set of SRMs, wherein the determined set of weights is based on the first facial expression metric.

18. The computer readable medium of claim 11, wherein the instructions that cause a programmable device to determine the first facial expression metric comprise instructions that cause the programmable device to determine the first facial expression metric based on weights assigned to each SRM of the first set of SRMs based on the received first head pose information.

19. The computer readable medium of claim 18, wherein the weights are assigned based, at least in part, on how closely received first head pose information matches an orientation corresponding to the first range of head poses associated with each SRM of the first set of SRMs.

20. A computing device comprising:
one or more processors; and
a memory, operatively coupled to the one or more processors, wherein the memory is configured to store instructions that, when executed by the one or more processors, cause the one or more processors to:
receive a first training facial image of a head from a plurality of training facial images, the first training facial image having a preselected attribute within a first range of head poses associated with a set of specialized recognition engines (SREs);
receive a first set of specialized recognition metrics (SRMs) associated with the first training facial image, each SRM of the first set of SRMs associated with a SRE of the set of SREs;
receive first head pose information for the first training facial image;
determine a first facial expression metric based on the first set of SRMs and the received first head pose information;
associate the first facial expression metric with the received first head pose information.

* * * * *